United States Patent [19]

Eida et al.

[11] Patent Number: 5,215,578
[45] Date of Patent: Jun. 1, 1993

[54] INK CONTAINING TRIS-AZO DYE, INK-JET RECORDING METHOD AND APPARATUS USING THE SAME

[75] Inventors: Tsuyoshi Eida, Yokohama; Mayumi Yamamoto, Tokyo; Takao Yamamoto, Isehara, all of Japan

[73] Assignee: Canon Kabushiki Kaisha, Tokyo, Japan

[21] Appl. No.: 815,506

[22] Filed: Jan. 2, 1992

[30] Foreign Application Priority Data

Jan. 18, 1991 [JP] Japan .................. 3-016824

[51] Int. Cl.$^5$ ............................................. C09D 11/02
[52] U.S. Cl. .................... 106/22 K; 534/679; 534/680; 534/678; 534/754; 534/755; 534/766; 534/770; 534/773; 346/1.1
[58] Field of Search ............. 106/22, 22 K; 534/679, 534/680, 678, 754, 755, 766, 770, 773; 346/1.1

[56] References Cited

U.S. PATENT DOCUMENTS

| | | | |
|---|---|---|---|
| 2,362,548 | 11/1944 | Gyr et al. | 534/679 |
| 4,208,324 | 6/1980 | Ramanathan | 534/766 |
| 4,557,761 | 12/1985 | Kobayashi et al. | 106/22 |
| 4,661,158 | 4/1987 | Kobayashi et al. | 106/22 |
| 4,734,489 | 3/1988 | Kawasaki et al. | 106/23 |
| 4,765,838 | 8/1988 | Ohata et al. | 106/20 |
| 4,804,411 | 2/1989 | Eida et al. | 106/22 |
| 4,841,037 | 6/1989 | Ohta et al. | 106/21 |
| 4,864,324 | 9/1989 | Shirota et al. | 346/1.1 |
| 5,082,496 | 1/1992 | Yamamoto et al. | 106/22 |

FOREIGN PATENT DOCUMENTS

3619573 12/1986 Fed. Rep. of Germany.

Primary Examiner—Mark L. Bell
Assistant Examiner—Helene Klemanski
Attorney, Agent, or Firm—Fitzpatrick, Cella, Harper & Scinto

[57] ABSTRACT

An ink composition that includes water, a water-soluble organic solvent and a dye. The dye is represented by the following Formula, in which the number of sulfonic acid groups and the number of amino groups are each not less than 2, and the number of sulfonic acid groups is less than that of amino groups:

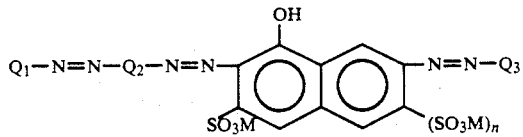

$Q_1$ denotes a substituted phenyl group, pyridyl group or naphthyl group; $Q_2$ denotes a substituted or unsubstituted p-phenylene group or 1,4-naphthylene group; $Q_3$ is a $SO_3M$-substituted or unsubstituted diaminopyridyl group or a diaminophenyl group substituted by COOM or $SO_3M$; M denotes an alkaline metal, ammonium or organic ammonium; and n denotes 0 or 1.

16 Claims, 3 Drawing Sheets

FIG. IA
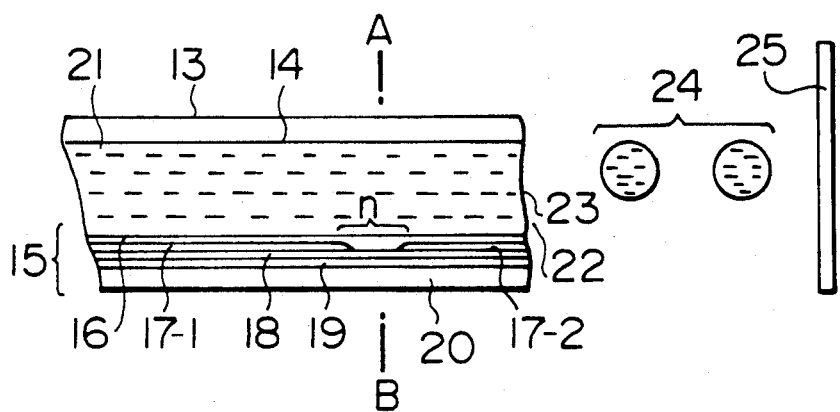
FIG. IB
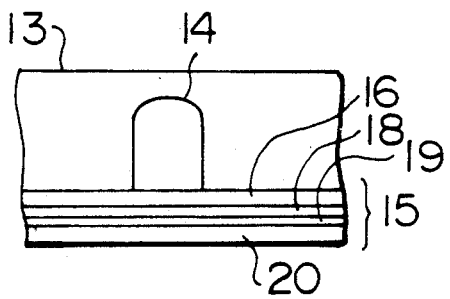
FIG. 2
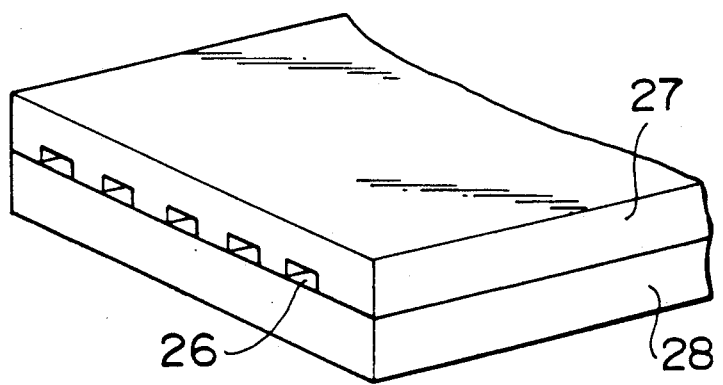

INK CONTAINING TRIS-AZO DYE, INK-JET RECORDING METHOD AND APPARATUS USING THE SAME

BACKGROUND OF THE INVENTION

1. Field of the Invention

The present invention relates to an ink which gives an image with excellent water fastness even when printed on a plain paper, and also relates to an ink-jet recording method and apparatus using the same.

2. Related Background

Inks with greatly varying compositions have been hitherto reported with respect to inks for ink-jet recording. In particular, in recent years, detailed research and developments have been made from various approaches such as composition and physical properties so that a good record can be made even on a plain paper, such as paper for copying, paper for reporting, notepaper, letter paper, bond paper or continuous slip paper, commonly used in offices. For example, water-based ink including a water-soluble dye is generally used in ink-jet recording. When a record is carried out on various kinds of recording media using this kind of ink, the image can blur due to sweat or water droplets, and becomes unclear and ruined because the dye used in ink is water-soluble.

SUMMARY OF THE INVENTION

Accordingly, an object of the present invention is to provide an ink that can provide an image with excellent waterfastness when printed, even on a plain paper.

An object of the present invention is also to provide an ink-jet recording method and apparatus using the same.

The above objects of the present invention can be achieved by the present invention described below.

The present invention provides an ink comprising water, a water-soluble organic solvent and a dye, wherein the dye comprises a dye of the following Formula I, in which the number of sulfonic acid groups and the number of amino groups are each not less than 2, and the number of sulfonic acid groups is less than that of amino groups:

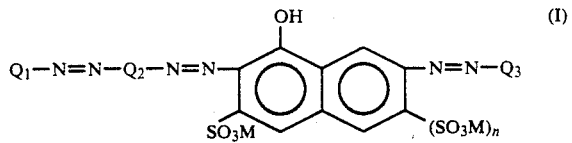

wherein $Q_1$ is a substituted phenyl group, pyridyl group or naphthyl group; $Q_2$ is a substituted or unsubstituted p-phenylene group or 1,4-naphthylene group; $Q_3$ is a $SO_3M$-substituted or unsubstituted diaminopyridyl group or a diaminophenyl group substituted by COOM or $SO_3M$; M is an alkali metal, ammonium or organic ammonium; and n is 0 or 1.

The present invention also provides an ink-jet recording method comprising ejecting ink described above from an orifice of a recording head in accordance with a recording signal to make a record on a recording medium.

The present invention also provides a recording unit comprising an ink container that holds an ink described above and a head from which the ink is ejected in the form of droplets.

The present invention also provides an ink-jet recording apparatus comprising a recording unit described above.

The present invention also provides an ink cartridge comprising an ink container that holds the ink described above.

The present invention also provides an ink-jet recording apparatus comprising an ink cartridge described above, a recording head for ejecting ink droplets, and an ink supplying portion for supplying ink to a recording head from the ink cartridge.

BRIEF DESCRIPTION OF THE DRAWINGS

FIGS. 1A and 1B illustrate a longitudinal vertical cross section and a transverse cross section, respectively, of a head of an ink-jet recording apparatus.

FIG. 2 is a perspective illustration of a head comprised of a multiple set of the heads as shown in FIGS. 1A and 1B.

DESCRIPTION OF THE PREFERRED EMBODIMENTS

Figure 3:
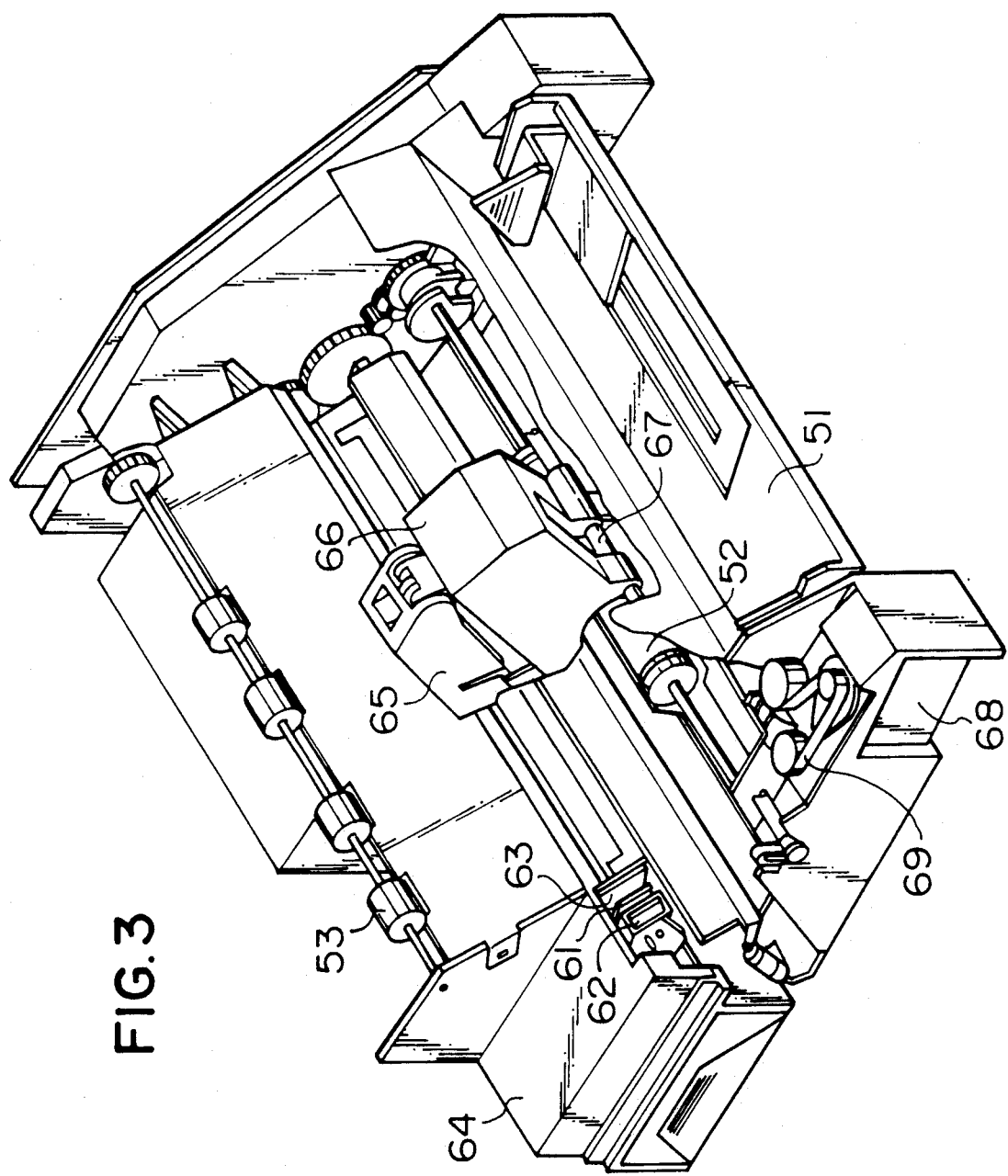
FIG. 3 is a perspective illustration of an example of ink-jet recording apparatus.

By using a particular colorant (dye) in ink, it is possible to provide an ink which can provide an image with excellent waterfastness even when printed on a plain paper, and an ink-jet recording method and apparatus using the same.

A dye represented by the above Formula I, which is used and characterized in the present invention, includes any dyes included in the above Formula I. The dye may be used alone or in combination with other dyes.

$Q_1$ is substituted preferably with at least one of $NH_2$ or $SO_3M$. Preferably from 1 to 2 amino groups are substituted either alone or with one $SO_3M$ group on $Q_1$. If desired, other combinations of $NH_2$ and/or $SO_3M$ groups are substituted on $Q_1$;

$Q_2$ is unsubstituted or substituted with at least one of $CH_3$, $OCH_3$, $NHCOCH_3$ or $SO_3M$. $Q_2$ is preferably substituted with from one to two groups which are the same or different.

$Q_3$ is a $SO_3M$-substituted or unsubstituted diaminopyridyl group or a diaminophenyl group substituted by COOM or $SO_3M$.

Particularly preferred dyes in a dye represented by the above Formula are as follows:

Exemplified Compound No. 1

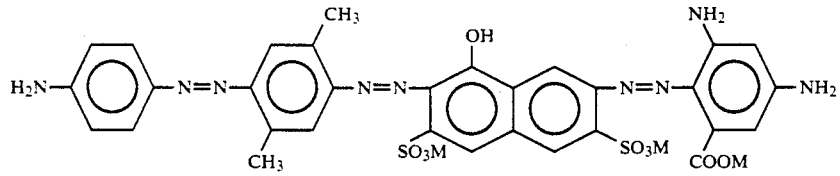
Exemplified Compound No. 2
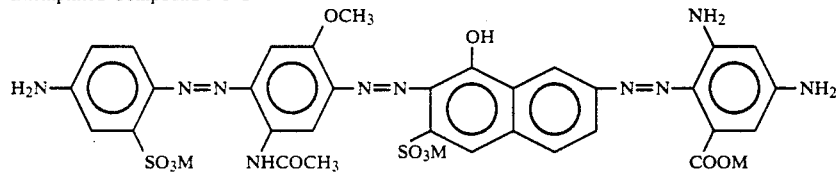
Exemplified Compound No. 3
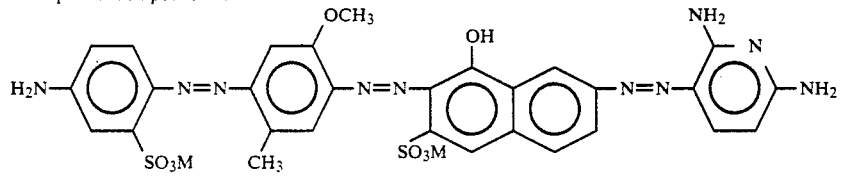
Exemplified Compound No. 4
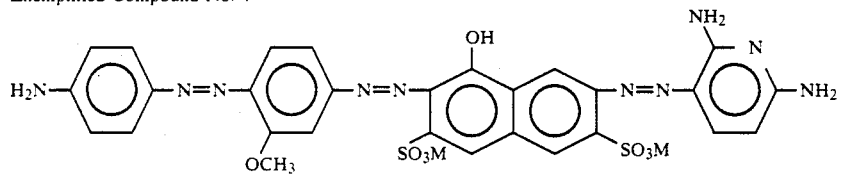
Exemplified Compound No. 5
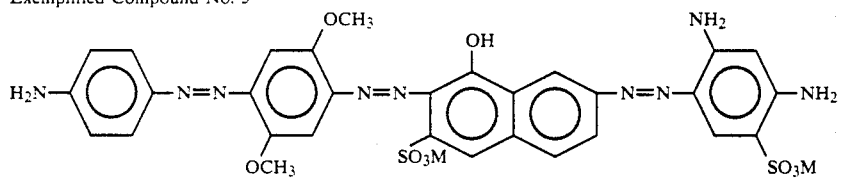
Exemplified Compound No. 6
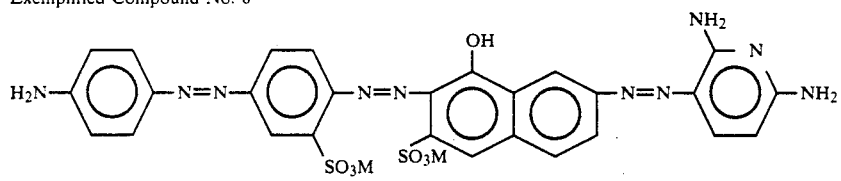
Exemplified Compound No. 7
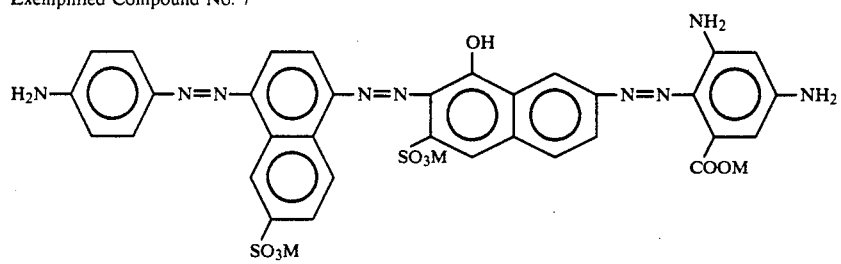
Exemplified Compound No. 8
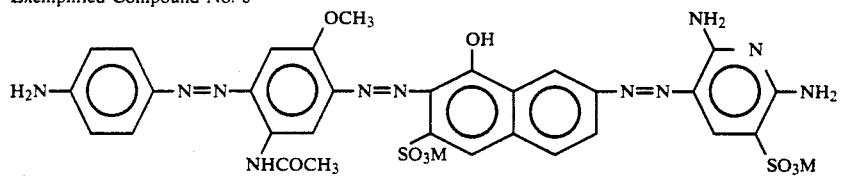

Exemplified Compound No. 9

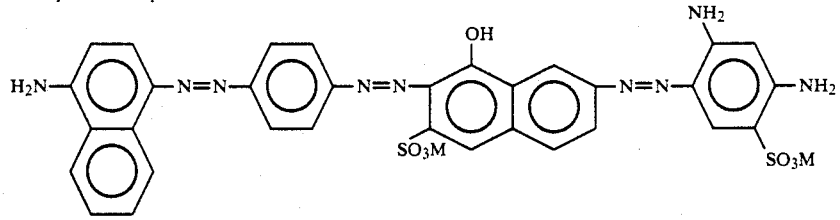

Exemplified Compound No. 10

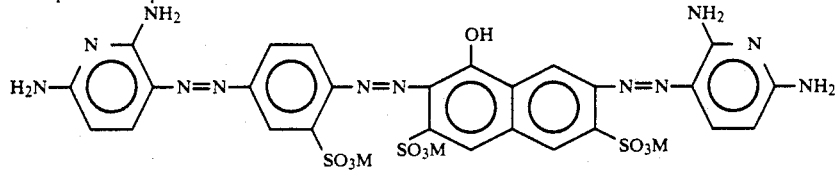

Exemplified Compound No. 11

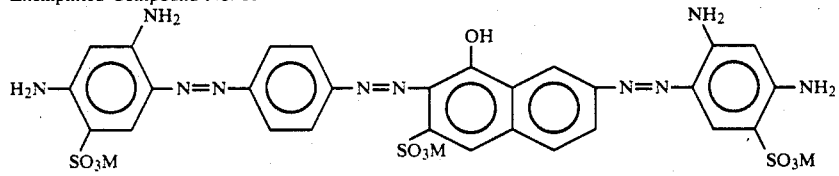

The amount of these dyes contained depends on the types of liquid medium components, the properties required in inks, etc. In general, the dye may be contained in an amount of approximately from 0.2% to 20% by weight, preferably from 0.5% to 10% by weight and more preferably from 1% to 5% by weight, based on the total weight of the ink.

The liquid medium used in the ink of the present invention comprises a mixture of water and water-soluble organic solvent. The water is preferably deionized water. Organic solvents preferably include, for example, alkyl alcohols having 1-5 carbon atoms such as methyl alcohol, ethyl alcohol, n-propyl alcohol, isopropyl alcohol, n-butylalcohol, sec-butylalcohol, tert-butyl alcohol, isobutyl alcohol and n-pentanol; amides such as dimethylformamide and dimethylacetamide; ketones or keto alcohols such as acetone and diacetone alcohol; ethers such as tetrahydrofuran and dioxane; oxyethylene or oxypropylene addition polymers such as diethylene glycol, triethylene glycol, tetraethylene glycol, dipropylene glycol, tripropylene glycol, polyethylene glycol and polypropylene glycol; alkylene glycols whose alkyl group has 2 to 6 carbon atoms, such as ethylene glycol, propylene glycol, trimethylene glycol, butylene glycol, 1,2,6-hexanetriol and hexylene glycol; lower alkyl ethers of polyhydric alcohols, such as ethylene glycol monomethyl or -ethyl ether, diethylene glycol monomethyl or -ethyl ether, triethylene glycol monomethyl or -ethyl ether; thiodiglycol; glycerol; lower dialkyl ethers of polyhydric alcohols, such as triethylene glycol dimethyl or -ethyl ether and tetraethylene glycol dimethyl or -ethyl ether; sulfolane, 2-pyrrolidone, N-methyl-2-pyrrolidone and 1,3-dimethyl-2-imidazolidinone.

The above water-soluble organic solvent may be contained in an amount of from 2% to 50% by weight, preferably from 2% to 30% by weight, based on the total weight of the ink.

The essential components of the ink of the present invention are as described above. It is possible to add other various kinds of dispersants, surfactants, viscosity modifiers, surface tension modifiers, and fluorescent brightening agents.

For example, these added components include viscosity modifiers such as polyvinyl alcohol, cellulose and water-soluble resins; all sorts of surfactants of cationic, anionic or nonionic nature; surface tension modifiers such as diethanolamine and triethanolamine; pH adjusters comprising a buffer; and mildewproofing agents.

For the purpose of preparing the ink used in an ink-jet recording method in which recording is carried out by electrifying ink, a resistivity modifier may be added. Such a resistivity modifier includes inorganic salts such as a lithium chloride, ammonium chloride and sodium chloride.

The ink of the present invention can be particularly preferably used in the ink-jet recording in which recording is carried out by ejecting ink droplets using a phenomenon of ink bubbling caused by heat energy. When the ink is used in such an ink-jet recording, ejection of the ink becomes particularly stable and satellite dots do not occur. In this instance, thermal physical properties such as specific heat, thermal expansion coefficient, and thermal conductivity may be adjusted.

The ink of the present invention can resolve the problems concerning the feathering of ink, the drying performance of recorded matter and the permeation of ink, which arise when recording is carried out on plain paper or the like. At the same time, it can match the recording head in an improved state. From these viewpoints, the physical properties of the ink should be adjusted to give a surface tension of from 30 to 68 dyne/cm at 25° C. and a viscosity of not more than 15 cP, preferably not more than 10 cP, and more preferably not more than 5 cP.

Accordingly, in order to adjust the ink so as to have the properties described above and to resolve the problems on plain paper, water may be contained in the ink in an amount of not less than 50% by weight, preferably not less than 60% by weight, more preferably not less than 75% by weight, based on the total weight of the ink.

The ink of the present invention can be particularly preferably used in ink-jet recording in which recording is carried out by ejecting ink droplets by an action of heat energy. Needless to say, it can also be used for usual writing implements.

The method and apparatus suited to carry out recording by the use of the ink of the present invention may include a method and apparatus in which a heat energy corresponding to a recording signal is imparted to the ink held in the interior of a thermal recording head so that ink droplets are generated by an action of the heat energy.

FIGS. 1A and 1B show an example of the construction of the head, which is a main component of the apparatus.

A head 13 is formed by bonding a glass, ceramic or plastic plate or the like having a groove 14 through which ink is passed, to a heating head 15 used in thermal recording (the drawing shows a head, to which, however, the present invention is not limited). The heating head 15 is constituted of a protection layer 16 formed of silicon oxide or the like, aluminum electrodes 17-1 and 17-2, a heating resistor layer 18 formed of nichrome and so forth, a heating accumulating layer 19, and a substrate plate 20 with a good heat dissipation property.

The ink 21 reaches an ejection orifice 22 (a minute opening) and a meniscus 23 is formed there by a pressure P.

Now, upon application of electric signals to the electrodes 17-1 and 17-2, heat is abruptly generated at the region denoted by n in the heating head 15, so that bubbles are generated in the ink 21 coming into contact with this region. The pressure thus produced thrusts out the meniscus 23 and the ink 21 is ejected from the orifice 22 in the form of recording droplets 24 to fly against a recording medium 25. FIG. 2 illustrates a multi-head comprising the head as showing in FIG. 1A arranged in a large number. The multi-head is prepared by closely adhering a glass plate 27 having multi-grooves 26, to a heating head 28 similar to the head as illustrated in FIG. 1A.

FIG. 1A is a cross-sectional view of the head 13 along its ink flow path, and FIG. 1B is a cross-sectional view along the line A-B in FIG. 1A.

FIG. 3 shows an example of an ink-jet recording apparatus in which such a head has been incorporated. In FIG. 3, reference numeral 61 denotes a blade serving as a wiping member, one end of which is a stationary end retained by a blade-retaining member. The blade 61 is provided at the position adjacent to the region in which a recording head makes a record. In the present example, the blade is retained in such a form that it protrudes into the course through which the recording head is moved. Reference numeral 62 denotes a cap, which is provided at the home position adjacent to the blade 61, and is so constituted that it moves in the direction perpendicular to the direction in which the recording head is moved and comes into contact with the face of ejection openings to carry out capping. Reference numeral 63 denotes an ink absorption member provided adjoiningly to the blade 61, and, similar to the blade 61, is retained in such a form that it protrudes into the course through which the recording head is moved. The above blade 61, cap 62 and ink absorption member 63 constitute an ejection-recovery portion 64, where the blade 61 and the ink absorption member 63 remove water, dust or the like from the ink ejection opening face.

Reference numeral 65 denotes the recording head having an ejection energy generating means and ejects ink to the recording medium set opposingly to the ejection opening face provided with ejection openings, to carry out recording. Reference numeral 66 denotes a carriage on which the recording head 65 is mounted so that the recording head 65 can be moved. The carriage 66 is slideably associated with a guide rod 67. A part of the carriage 66 is connected (not shown) with a belt 69 driven by a motor 68. Thus, the carriage 66 can be moved along the guide rod 67 and hence the recording head 65 can be moved from a recording region to a region adjacent thereto.

Reference number 51 denotes a paper feeding part from which recording media are inserted, and number 52 denotes a paper feed roller driven by a motor (not shown). With such construction, the recording medium is fed to the position opposing to the ejection opening face of the recording head, and, with progress of recording, outputted from a paper output section provided with a paper output roller 53.

In the above constitution, the cap 62 of the ejection-recovery portion 64 is receded from the moving course of the recording head 65 when the recording head 65 is returned to its home position, e.g., after completion of recording, and the blade 61 stands protruded into the moving course. As a result, the ejection opening face of the recording head 65 is wiped. When the cap 62 comes into contact with the ejection opening face of the recording head 65 to carry out capping, the cap 62 is moved in such a way that it protrudes into the moving course of the recording head.

When the recording head 65 is moved from its home position to the position at which recording is started, the cap 62 and the blade 61 are at the same position as the position where the ejection opening face is wiped. As a result, the ejection opening face of the recording head 65 is wiped also at the time of this movement.

The above movement of the recording head to its home position is made not only at the time of the completion of recording or restoration of ejection, but also when the recording head is moved between recording regions for the purpose of recording, during which it is moved to the home position adjacent to each recording region at given intervals, where the ejection opening face is wiped in accordance with this movement.

Figure 4:
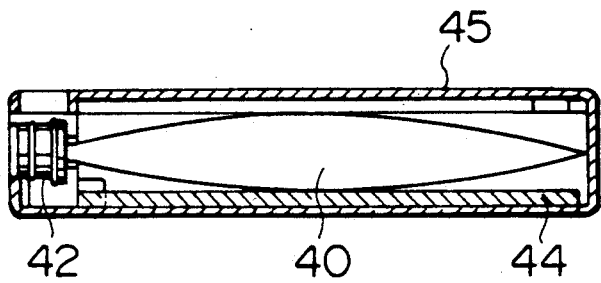
FIG. 4 is a longitudinal cross-sectional illustration of an ink cartridge.

FIG. 4 shows an example of an ink cartridge, denoted as 45, that holds the ink being fed to the head through an ink-feeding member as exemplified by a tube (not shown). Herein reference numeral 40 denotes an ink container portion that holds the feeding ink, as exemplified by an ink bag. The top thereof is provided with a stopper 42 made of rubber. A needle (not shown) may be inserted into this stopper 42 so that the ink in the ink container portion 40 can be fed to the head. Reference numeral 44 denotes an absorption member that receives a waste ink.

It is preferred in the present invention that the ink holder is formed of a polyolefin, in particular, polyethylene, at its surface with which the ink comes into contact.

Figure 5:
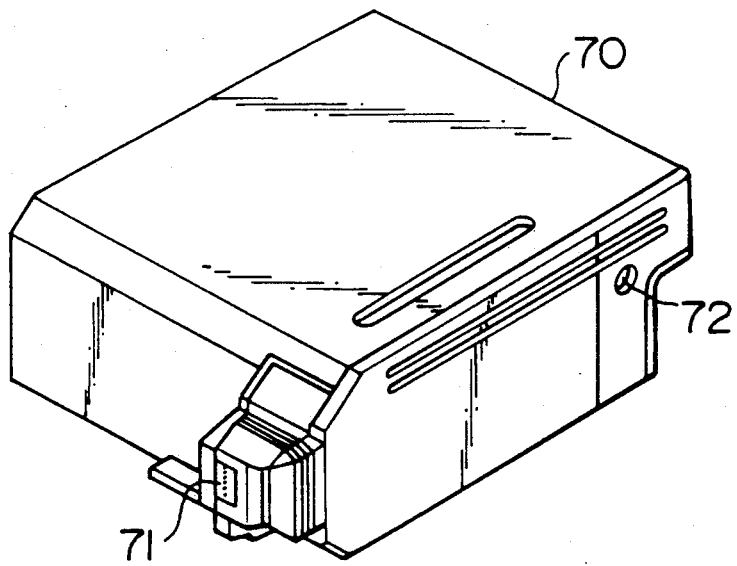
FIG. 5 is a perspective illustration of a recording unit.

The ink-jet recording apparatus used in the present invention may not be limited to the apparatus as described above in which the head and the ink cartridge are separately provided, and a device can also be preferably used in which these are integrally formed as shown in FIG. 5.

In FIG. 5, reference numeral 70 denotes a recording unit, in the interior of which an ink container portion that holds an ink, as exemplified by an ink absorption member, is contained. The recording unit is so constructed that the ink in such an ink absorption member is ejected in the form of ink droplets from a head 71 having a plurality of orifices. As a material for the ink absorption member, it is preferred in the present invention to use polyurethane.

Reference numeral 72 denotes an air path opening through which the interior of the recording unit is made to communicate with the atmosphere.

This recording unit 70 can be used in place of the recording head shown in FIG. 3, and is detachably mounted to the carriage 66.

The present invention will be described below in a more specific manner by giving Examples and Comparative Examples. In the following, "part(s)" and "%" are by weight unless particularly noted.

EXAMPLES 1 TO 5

Inks A to D of the present invention are prepared using Exemplified Compound as follows.

| Ink A: | |
| --- | --- |
| Ethylene glycol | 25 parts |
| N-methyl-2-pyrrolidone | 10 parts |
| Deionized water | 60 parts |
| Exemplified Compound No. 2 (M=Na) | 5 parts |
| Ink B: | |
| Diethylene glycol | 15 parts |
| Deionized water | 82 parts |
| Exemplified Compound No. 5 (M=NH$_4$) | 3 parts |
| Ink C: | |
| Ethylene glycol | 20 parts |
| Deionized water | 76 parts |
| Exemplified Compound No. 9 (M=NH(C$_2$H$_4$OH)$_3$) | 4 parts |
| Ink D: | |
| Triethylene glycol | 25 parts |
| Ethylene glycol monomethyl ether | 15 parts |
| Deionized water | 55 parts |
| Exemplified Compound No. 11 (M=Na) | 5 parts |

Next, solid printing was performed using inks A to D and a recording apparatus incorporating an on-demand type multi-head (trade name: BJ-130, manufactured by Canon Inc.) in which a heat energy is imparted to the ink held in the interior of a recording head so that ink droplets are generated by an action of the heat energy.

Printing was performed on paper recommended for copying machines, NP-6150 (trade name: manufactured by Canon Inc.), Neusiedler paper and Prover Bond paper so as to prepare a patch with a size of 10×20 mm. Each of the optical densities in patches was in the range of 1.25 to 1.50.

These patches were immersed in water at 20° C. for 3 hours. Thereafter, the patches were taken out of the water and dried. Waterfastness was evaluated by measuring a decrease rate of optical density in each patch. Each of the patches had a decrease rate of not more than 15% and showed excellent waterfastness.

COMPARATIVE EXAMPLES 1 TO 4

Inks E to H were prepared using the following components. Waterfastness was evaluated in the same manner as in Examples 1 to 4. As a result, each of the patches had a decrease rate of optical density of not less than 40%.

| Ink E: | |
| --- | --- |
| Ethylene glycol | 25 parts |
| N-methyl-2 pyrrolidone | 10 parts |
| Deionized water | 60 parts |
| Reference Compound No. 1 (M=Na) | 3 parts |
| Ink F: | |
| Diethylene qlycol | 15 parts |
| Deionized water | 82 parts |
| Reference Compound No. 2 (M=NH$_4$) | 3 parts |
| Ink G: | |
| Diethylene glycol | 20 parts |
| Deionized water | 76 parts |
| Reference Compound No. 3 (M=NH((C$_2$H$_4$OH)$_3$) | 4 parts |
| Ink H: | |
| Triethylene glycol | 25 parts |
| Ethylene glycol monomethyl ether | 15 parts |
| Deionized water | 55 parts |
| Reference Compound No. 4 (M=Na) | 5 parts |

Reference Compound No. 1

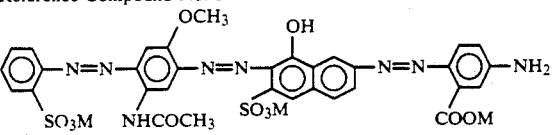

Reference Compound No. 2

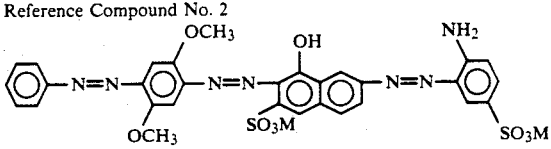

Reference Compound No. 3

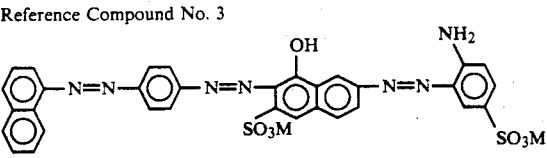

Reference Compound No. 4

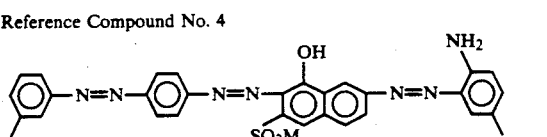

In these Reference Compounds, the number of sulfonic acid groups is more than that of amino groups. Also, in each Reference Compound the number of amino groups is less than 2. The Q$_2$ and Q$_3$ groups in the reference compounds may individually be employed in the present invention and the Q$_1$ when substituted, may be employed, provided that the number of amino groups and sulfonic groups are each at least 2 and the number of amino groups is larger than the number of sulfonic groups.

As described above, according to the present invention, it is possible to provide an ink that can give a printed matter with excellent waterfastness on a plain paper by choosing a particular type of dye.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink comprising water, a water-soluble organic solvent and a dye, wherein the dye comprises a dye of the following Formula, in which the number of sulfonic acid groups and the number of amino groups are each not less than 2, and the number of sulfonic acid groups is less than the number of amino groups:

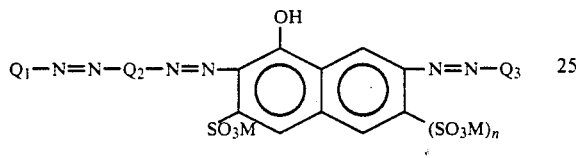

wherein $Q_1$ is a substituted phenyl group, a substituted pyridyl group or a substituted naphthyl group, said substituted group being substituted with at least one of $NH_2$ or $SO_3M$; $Q_2$ is a substituted p-phenylene group or a substituted 1,4-naphthylene group, said substituted group being substituted with at least one of $CH_3$, $OCH_3$, $NHCOCH_3$, or $SO_3M$; $Q_3$ is a $SO_3M$-substituted or unsubstituted diaminopyridyl group or a diaminophenyl group substituted by COOM or $SO_3M$; M is an alkali metal, ammonium or organic ammonium; and n is 0 or 1.

2. An ink according to claim 1, wherein the dye is contained in an amount ranging approximately from 0.2% to 20% by weight based on the total weight of the ink.

3. An ink according to claim 1, wherein the water-soluble organic solvent is contained in an amount ranging from 2% to 50% by weight based on the total weight of the ink.

4. An ink-jet recording method comprising the step of:
ejecting droplets of ink from an orifice in accordance with a recording signal to make a record on a recording medium, wherein said ink comprises water, a water-soluble organic solvent and a dye, wherein the dye comprises a dye of the following Formula, in which the number of sulfonic acid groups and the number of amino groups are each not less than 2, and the number of sulfonic acid groups is less than the number of amino groups:

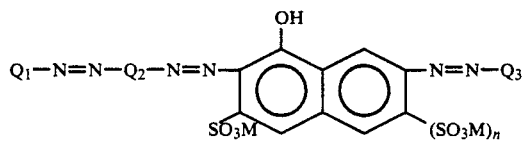

wherein $Q_1$ is a substituted phenyl group, a substituted pyridyl group or a substituted naphthyl group, said substituted group being substituted with at least one of $NH_2$ or $SO_3M$; $Q_2$ is a substituted p-phenylene group or a substituted 1,4-naphthylene group, said substituted group being substituted with at least one of $CH_3$, $OCH_3$, $NHCOCH_3$, or $SO_3M$; $Q_3$ is a $SO_3M$-substituted or unsubstituted diaminopyridyl group or a diaminophenyl group substituted by COOM or $SO_3M$; M is an alkali metal, ammonium or organic ammonium; and n is 0 or 1.

5. An ink-jet recording method according to claim 4, including ejecting droplets of ink by applying a heat energy on the ink.

6. A recording unit comprising:
(i) an ink container that holds an ink comprising water, a water-soluble organic solvent and a dye, wherein the dye comprises a dye of the following Formula, in which the number of sulfonic acid groups and the number of amino groups are each not less than 2, and the number of sulfonic acid groups is less than the number of amino groups:

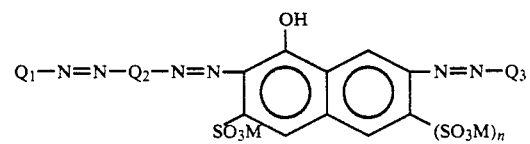

wherein $Q_1$ is a substituted phenyl group, a substituted pyridyl group or a substituted naphthyl group, said substituted group being substituted with at least one of $NH_2$ or $SO_3M$; $Q_2$ is a substituted p-phenylene group or a substituted 1,4-naphthylene group, said substituted group being substituted with at least one of $CH_3$, $OCH_3$, $NHCOCH_3$, or $SO_3M$; $Q_3$ is a $SO_3M$-substituted or unsubstituted diaminopyridyl group or a diaminophenyl group substituted by COOM or $SO_3M$; M is an alkali metal, ammonium or organic ammonium; and n is 0 or 1; and (ii) a head from which the ink is ejected in the form of ink droplets.

7. A recording unit according to claim 6, wherein the head comprises a thermal head in which a heat energy is applied on the ink so that the ink droplets are ejected.

8. A recording unit according to claim 6, wherein the ink container is an ink bag or an ink absorption member.

9. An ink cartridge comprising an ink container portion that holds an ink comprising water, a water-soluble organic solvent and a dye, wherein the dye comprises a dye of the following Formula, in which the number of sulfonic acid groups and the number of amino groups are each not less than 2, and the number of sulfonic acid groups is less than the number of amino groups:

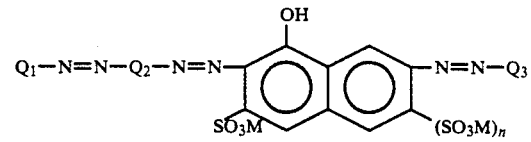

wherein $Q_1$ is a substituted phenyl group, a substituted pyridyl group or a substituted naphthyl group, said substituted group being substituted with at least one of $NH_2$ or $SO_3M$; $Q_2$ is a substituted p-phenylene group or a substituted 1,4-naphthylene group, said substituted group being substituted with at least one of $CH_3$, $OCH_3$, $NHCOCH_3$, or $SO_3M$; $Q_3$ is a $SO_3M$-substituted or unsubstituted diaminopyridyl group or a diaminophenyl group substituted by COOM or $SO_3M$; M is an alkali metal, ammonium or organic ammonium; and n is 0 or 1.

10. An ink cartridge according to claim 9, wherein the ink container is an ink bag or an ink absorption member.

11. An ink-jet recording apparatus comprising a recording unit having:

(i) an ink container portion that holds an ink comprising water, a water-soluble organic solvent and a dye, wherein the dye comprises a dye of the following Formula, in which the number of sulfonic acid groups and the number of amino groups are each not less than 2, and the number of sulfonic acid groups is less than the number of amino groups:

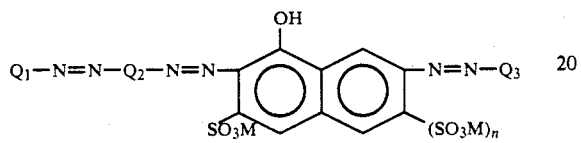

wherein $Q_1$ is a substituted phenyl group, a substituted pyridyl group or a substituted naphthyl group, said substituted group being substituted with at least one of $NH_2$ or $SO_3M$; $Q_2$ is a substituted p-phenylene group or a substituted 1,4-naphthylene group, said substituted group being substituted with at least one of $CH_3$, $OCH_3$, $NHCOCH_3$, or $SO_3M$; $Q_3$ is a $SO_3M$-substituted or unsubstituted diaminopyridyl group or a diaminophenyl group substituted by COOM or $SO_3M$; M is an alkali metal, ammonium or organic ammonium; and n is 0 or 1; and (ii) a head from which the ink is ejected in the form of ink droplets.

12. An ink-jet recording apparatus according to claim 11, wherein the head comprises a thermal head in which a heat energy is applied on the ink so that the ink droplets are ejected.

13. An ink-jet recording apparatus according to claim 11, wherein the ink container is an ink bag or an ink absorption member.

14. An ink-jet recording apparatus comprising:

a recording head from which ink droplets are ejected;

an ink cartridge having an ink container portion that holds an ink comprising water, a water-soluble organic solvent and a dye, wherein the dye comprises a dye of the following Formula, in which the number of sulfonic acid groups and the number of amino groups are each not less than 2, and the number of sulfonic acid groups is less than the number of amino groups:

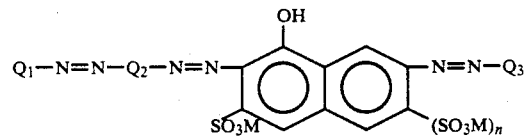

wherein $Q_1$ is a substituted phenyl group, a substituted pyridyl group or a substituted naphthyl group, said substituted group being substituted with at least one of $NH_2$ or $SO_3M$; $Q_2$ is a substituted p-phenylene group or a substituted 1,4-naphthylene group, said substituted group being substituted with at least one of $CH_3$, $OCH_3$, $NHCOCH_3$, or $SO_3M$; $Q_3$ is a $SO_3M$-substituted or unsubstituted diaminopyridyl group or a diaminophenyl group substituted by COOM or $SO_3M$; M is an alkali metal, ammonium or organic ammonium; and n is 0 or 1; and an ink supplying portion which supplies ink from the ink cartridge to the recording head.

15. An ink-jet recording apparatus according to claim 14, wherein the recording head comprises a thermal head in which a heat energy is applied on the ink so that the ink droplets are ejected.

16. An ink-jet recording apparatus according to claim 14, wherein the ink container is an ink bag or an ink absorption member.

* * * * *